United States Patent
Barefoot et al.

(10) Patent No.: US 9,731,574 B2
(45) Date of Patent: Aug. 15, 2017

(54) SHOCK ABSORBER GAS SPRING SEAL

(71) Applicant: Eko Sport, Inc., Grand Junction, CO (US)

(72) Inventors: Darek C. Barefoot, Grand Junction, CO (US); Eric Prinster, Grand Junction, CO (US); Scott Winans, Grand Junction, CO (US)

(73) Assignee: Eko Sport Inc., Grand Junction, CO (US)

(*) Notice: Subject to any disclaimer, the term of this patent is extended or adjusted under 35 U.S.C. 154(b) by 139 days.

(21) Appl. No.: 14/465,944

(22) Filed: Aug. 22, 2014

(65) Prior Publication Data
US 2015/0054247 A1 Feb. 26, 2015

Related U.S. Application Data
(60) Provisional application No. 61/869,095, filed on Aug. 23, 2013.

(51) Int. Cl.
| | |
|---|---|
| *F16F 9/36* | (2006.01) |
| *B60G 11/27* | (2006.01) |
| *B62K 25/04* | (2006.01) |
| *B60G 15/12* | (2006.01) |

(52) U.S. Cl.
CPC .............. *B60G 11/27* (2013.01); *B60G 15/12* (2013.01); *B62K 25/04* (2013.01); *F16F 9/36* (2013.01); *B60G 2202/15* (2013.01); *B60G 2202/32* (2013.01)

(58) Field of Classification Search
CPC .... B60G 11/27; B60G 15/12; B60G 2202/15; B60G 2202/32; F16F 9/36; B62K 25/04

USPC ....................................................... 188/322.16
See application file for complete search history.

(56) References Cited

U.S. PATENT DOCUMENTS

| | | | |
|---|---|---|---|
| 3,794,309 A | | 2/1974 | Chrokey et al. |
| 3,888,436 A | * | 6/1975 | Sealey ................... B64C 25/60 |
| | | | 188/284 |
| RE29,497 E | * | 12/1977 | Freitag ................. F16J 15/3204 |
| | | | 188/269 |
| 4,226,408 A | | 10/1980 | Tomita et al. |
| 4,257,499 A | | 3/1981 | Deschner |
| 4,438,834 A | * | 3/1984 | Handke ................... F16F 9/364 |
| | | | 188/315 |
| 4,445,598 A | * | 5/1984 | Brambilla ............... F16F 9/364 |
| | | | 188/315 |
| 4,718,647 A | * | 1/1988 | Ludwig ................... F16F 9/585 |
| | | | 188/322.15 |
| 4,746,106 A | * | 5/1988 | Fukumura ............... F16F 9/468 |
| | | | 267/218 |
| 4,864,886 A | * | 9/1989 | Burgei ....................... B60R 7/04 |
| | | | 180/315 |
| 5,775,677 A | | 7/1998 | Englund |
| 5,810,130 A | | 9/1998 | McCandless |
| 6,003,848 A | * | 12/1999 | Cotter ................... F16F 9/0218 |
| | | | 188/322.16 |

(Continued)

*Primary Examiner* — Robert A Siconolfi
*Assistant Examiner* — James Hsiao
(74) *Attorney, Agent, or Firm* — Jason H. Foster; Kremblas & Foster

(57) ABSTRACT

A shock absorber includes a first portion and a second portion that reciprocate relative to one another. The shock absorber includes a gas spring chamber defined between an interior wall and a plunger. A seal including a lip portion minimizes gas pressure loss and friction between the two portions.

20 Claims, 5 Drawing Sheets

(56) References Cited

U.S. PATENT DOCUMENTS

| | | | | |
|---|---|---|---|---|
| 6,135,434 A | * | 10/2000 | Marking | F16F 9/36 188/315 |
| 6,279,703 B1 | * | 8/2001 | Mete | F16F 9/44 188/319.1 |
| 6,296,092 B1 | * | 10/2001 | Marking | F16F 9/0209 188/315 |
| 6,311,962 B1 | | 11/2001 | Marking | |
| 6,318,525 B1 | | 11/2001 | Vignocchi et al. | |
| 6,360,857 B1 | * | 3/2002 | Fox | F16F 9/3485 188/281 |
| 6,543,754 B2 | * | 4/2003 | Ogura | B62K 25/04 188/317 |
| 7,028,574 B1 | * | 4/2006 | Bell | B60K 20/04 180/315 |
| 7,478,708 B2 | * | 1/2009 | Bugaj | B60G 21/073 188/304 |
| 7,641,028 B2 | | 1/2010 | Fox | |
| 8,499,905 B2 | * | 8/2013 | Uchiyama | B62K 25/08 188/266 |
| 9,038,791 B2 | * | 5/2015 | Marking | B60G 13/08 188/314 |
| 2003/0234144 A1 | * | 12/2003 | Fox | B62K 25/04 188/278 |
| 2006/0219507 A1 | * | 10/2006 | Drott | B60T 11/236 188/322.17 |
| 2007/0119670 A1 | * | 5/2007 | Fox | B62K 25/04 188/275 |
| 2009/0200760 A1 | * | 8/2009 | Gartner | B60G 15/12 280/5.507 |
| 2011/0101579 A1 | * | 5/2011 | Polakowski | B60G 15/12 267/64.26 |
| 2012/0007327 A1 | * | 1/2012 | Talavasek | B62K 25/20 280/124.1 |

\* cited by examiner

SHOCK ABSORBER GAS SPRING SEAL

CROSS-REFERENCES TO RELATED APPLICATIONS

This application claims the benefit of U.S. Provisional Application No. 61/869,095 filed Aug. 23, 2013. This prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates generally to suspension components on vehicles. More particularly, the present disclosure relates to a shock absorber with a gas spring seal arrangement with reduced friction during compression for use on bicycles.

Reducing friction in the compression stroke may improve suspension response and allow for finer control of compression damping. These improvements are of particular interest for off-road cycling, where the combination of light component weight and suspension compliance is highly valued.

Shock absorbers that support the weight of the vehicle with compressed gas instead of coil or leaf springs may be attractive for applications where the weight of components must be kept as low as possible. Moreover, gas spring shocks may allow for convenient adjustability of the spring rate of the suspension, in some cases by increasing or decreasing the volume of gas within the shock. Both of these advantages have made gas spring shock absorbers a popular choice for mountain bikes. However, precisely because the ratio of vehicle-to-passenger weight may be low for bicycles, jounce may be transmitted efficiently and may be felt keenly by the cyclist. Where terrain is rugged, as in off-road cycling, it may be desirable for the bicycle's suspension to be as responsive as possible. The difference in responsiveness between gas-sprung and coil-sprung shocks has proven great enough to limit the use of gas-sprung shocks in off-road cycling.

Turning to FIGS. 1-4, a conventional gas spring shock may be seen. A conventional gas spring shock absorber 10 for lightweight vehicles, including bicycles, employs a piston 16 with a gas seal 35 that engages a cylinder 12. As the seal 35 on the piston 16 moves against the wall of the cylinder 12 during compression, the gas trapped in a compression chamber 22 between the seal 35 and the closed end 32 of the cylinder 12 offers progressively greater resistance to compressive movement as a simple function of rising pressure against the sectional area of the piston 16 and seal 35. Secondarily, this rising gas pressure causes the piston seal 35 to press with progressively greater force against the cylinder 12. The frictional adhesion of the seal 35 to the cylinder wall must be overcome before the shock absorber 10 will compress, decreasing responsiveness.

If an o-ring seal (not shown) is used on the piston of a conventional gas spring design, the contact area of the seal with the cylinder surface will be relatively large. The area of o-ring contact varies with pressure in the gas spring chamber, since pressure forces the o-ring axially toward one end of its gland and into conformity with the square-cornered sectional profile formed by the gland and cylinder wall. The relatively large contact patch of the o-ring under pressure adds significantly to the adhesion of the seal to the cylinder.

A u-cup or "X"-section seal (as shown in FIGS. 1-4) will have a smaller area of contact with the cylinder compared to an o-ring. However, in order to contain gas pressure reliably, the projecting lip 35a of such a seal must be angled toward the cylinder in the direction of compression and in the direction of its own movement in relation to the dynamically sealed surface. The angular abutment of the seal lip against the cylinder wall 12 drives the pressure of the seal material at the contact patch to high values during compression. The chisel-action of the seal lip creates significant adhesion of the seal material to the cylinder wall, partially offsetting the advantage of a smaller area of contact as compared with an o-ring.

The need therefore exists for a gas spring shock absorber with reduced adhesion of the dynamic gas containment seal during the compression stroke, thereby improving responsiveness.

BRIEF SUMMARY OF THE INVENTION

In one embodiment, a shock absorber for a vehicle includes a first end, a second end, and a dynamic gas seal. The first end may have an interior wall and may be adapted to be mounted to one of the frame and a first wheel of the vehicle. The second end may be reciprocally and slidably mounted to the first end. The second end may be adapted to be mounted to the other of the frame and the first wheel of the vehicle. A substantially gas-tight interior gas spring chamber may be defined between the first end and the second end. Gas pressure in the interior gas spring chamber may bias the first end and the second end away from one another. The dynamic gas seal may be attached to the first end. The dynamic gas seal may have at least one lip engaging the second end, thereby creating a substantially gas-tight barrier between the first end and the second end. Movement of the plunger into the interior gas spring chamber may reduce the size of the interior gas spring chamber by compressing gas in the chamber. This decrease in the interior volume of the interior gas spring chamber may cause the gas pressure in the interior gas spring chamber to rise in proportion to the decreased volume. Movement of the plunger out from the interior gas spring chamber may increase the size of the interior gas spring chamber and diminish the pressure on gas in the chamber. This increase in the interior volume of the interior gas spring chamber may cause the gas pressure in the interior gas spring chamber to fall in proportion to the increased volume. The dynamic gas seal may be the only dynamic seal attached between the first end and the second end and capable of creating a substantially gas-tight barrier between the first end and the second end.

The dynamic gas seal may further include a base portion disposed at a free end of the first end. The at least one lip of the dynamic gas seal may extend both radially and axially away from the base portion. The at least one lip may also sealingly contact the outer surface of the second end. Friction between the at least one lip and the second end may be lower when the plunger moves into the interior gas spring chamber than when the plunger moves out from the interior gas spring chamber. The at least one lip may extend axially farther than it does radially.

The vehicle may be a bicycle. The shock absorber may further include a hydraulic damper defined substantially within the second end. The hydraulic damper may further include a damper chamber within the second end. Air pressure from the interior gas spring chamber may pressurize fluid within the damper chamber. The hydraulic damper may further dampen movement of the plunger.

A suspension system may include a first suspension element, a second suspension element, and a dynamic seal. The first suspension element may include an interior wall. The second suspension element may be capable of reciprocating relative to the first suspension element and may have an exterior wall that slidingly interfits with and is capable of reciprocating relative to the first suspension element. The dynamic seal may have at least one lip and may minimize the escape of gas from within an interior gas chamber defined between the first suspension element and the second suspension element. The dynamic seal may be mounted on the first suspension element. The dynamic seal may be the only dynamic seal fixed to the first suspension element and capable of creating a substantially fluid-tight barrier between the first suspension element and the second suspension element. The interior wall of the first suspension element may fit closely with the exterior wall of the second suspension element regardless of the reciprocal position of the first suspension element relative to the second suspension element. The interior wall of the first suspension element may have a consistent circumference along its length.

The dynamic seal may further include a base portion disposed at a free end of the first suspension element. The at least one lip of the seal may extend both radially and axially away from the base portion. The at least one lip may sealingly contact an exterior wall of the second suspension element. Friction between the at least one lip and the second suspension element may be lower when the two suspension elements move relatively in one direction than when the two suspension elements move relatively in a second direction. The at least one lip may extend axially farther than it does radially.

The vehicle may be a bicycle. The suspension system may further include a hydraulic damper defined substantially within the second suspension element. The hydraulic damper may further include a damper chamber within the second suspension element. Air pressure from the interior gas chamber may pressurize fluid within the damper chamber. Fluid pressure from the damper chamber may pressurize air from the interior gas chamber.

Figure 1:
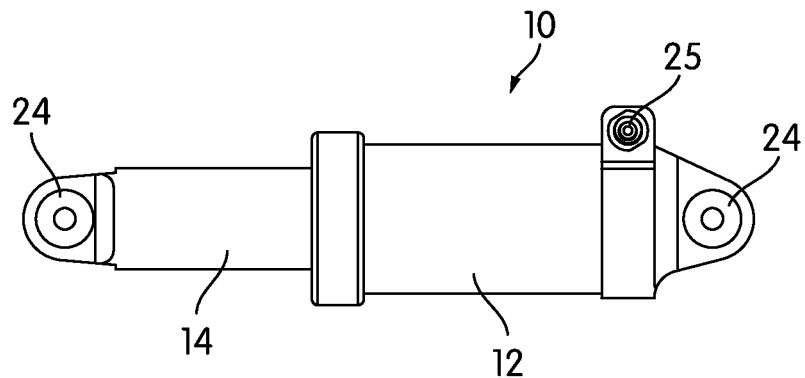
FIG. 1 is a side view of a prior art gas spring for a vehicle suspension.
Figure 2:
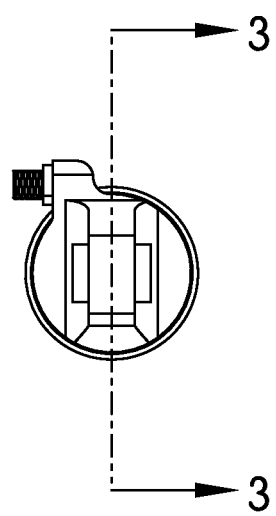
FIG. 2 is an end view of the spring of FIG. 1.
Figure 3:
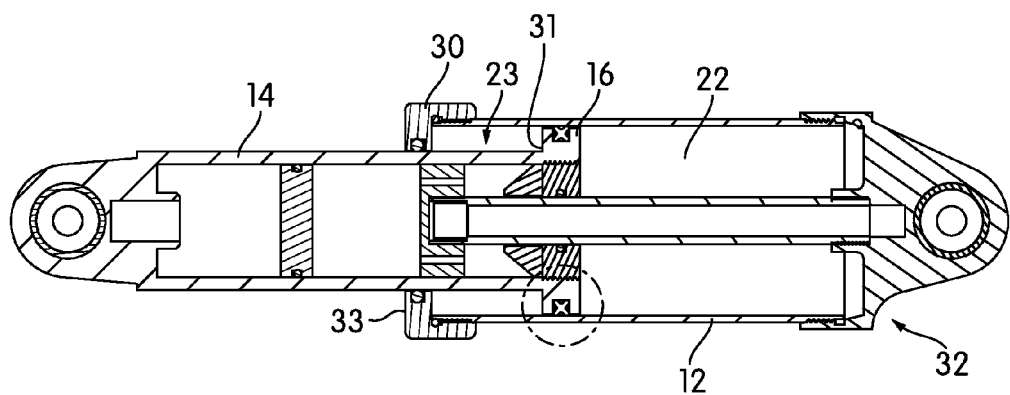
FIG. 3 is a cross-sectional view of the spring of FIG. 1 taken along line 3-3 of FIG. 2.
Figure 4:
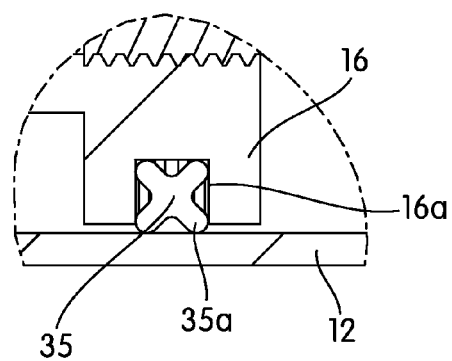
FIG. 4 is a detailed view of the area shown by a dashed circle in FIG. 3.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

In the present disclosure, the suspension structure may be described as it relates to a bicycle. However, the suspension structure described in the present embodiments may instead be applied to other vehicles. The present suspension structure may be used with vehicles having a different number of wheels, for example. The suspension structure may be used in connection with a motorized vehicle.

The present embodiments may reduce seal adhesion in a gas spring shock absorber. In some embodiments, the gas-compressing element may be a plunger or large-diameter blind rod slidingly engaging a seal contained in the cylinder. The lip of the u-cup that forms the dynamic gas containment seal may be angled toward the gas spring chamber so that rising pressure pushes the seal progressively harder against the surface of the plunger, but because the plunger surface moves compressively in the same direction in which the lip of the seal is biased, there is no accompanying chisel-action of the seal lip to compound the pressure at the contact patch and contribute undesirably to adhesion. By eliminating a structural contributor to seal adhesion ("stiction"), the present invention may be more responsive to bumps than is a conventional gas spring shock absorber.

Figure 5:
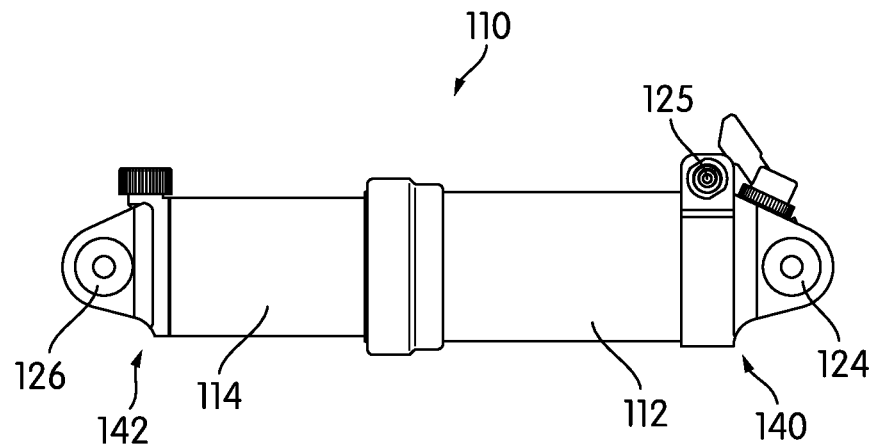
FIG. 5 is a side view of one embodiment of a vehicle suspension according to the present disclosure.
Figure 6:
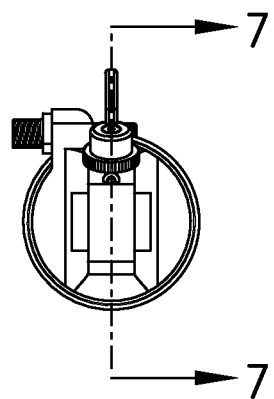
FIG. 6 is an end view of the suspension of FIG. 5.

Turning now to FIG. 5, a shock absorber or suspension system 110 may be seen. The suspension system 110 may have a first housing member, portion or end 112 and a second housing member, portion or end 114. A first eye hole 124 may extend from a closed end 140 of the first portion 112. A second eye hole 126 may extend from a closed end 142 of the second portion 114. In some vehicles, one of the first eye hole 124 and the second eye hole 126 may be directly or indirectly secured to a vehicle frame (not shown)

in conventional fashion. The other of the first eye hole 124 and the second eye hole 126 may be secured directly or indirectly to a vehicle wheel (not shown) in conventional fashion.

Figure 7:
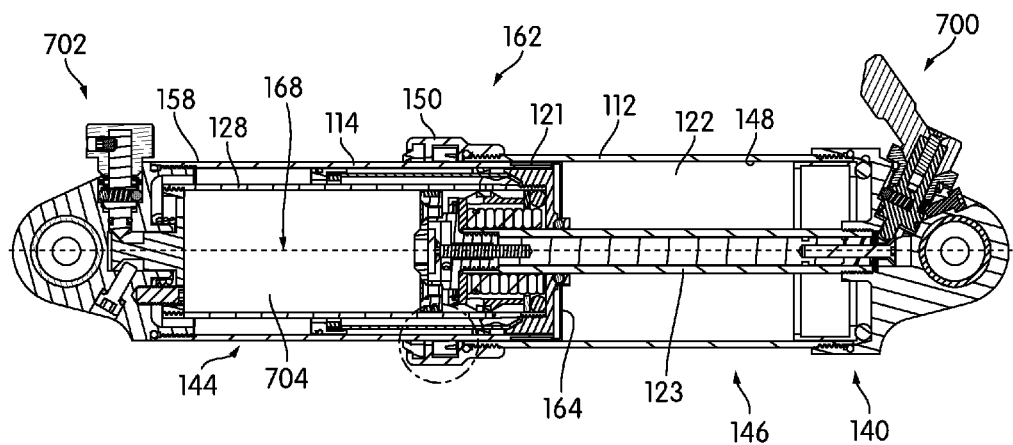
FIG. 7 is a cross-sectional view of the suspension of FIG. 5 taken along line 7-7 of FIG. 6.

As may be seen most clearly in FIG. 7, the suspension system may include two components. The first is a conventional hydraulic damping portion 144 and an air spring portion 146. While various components are illustrated of the hydraulic damping portion 144, these components are relatively conventional. Many other configurations of hydraulic damping may be substituted therefor by a designer or other person having ordinary skill in the art. Accordingly, these components are not further described in detail.

Turning now to the air spring portion 146, it may be seen that the first portion 112 may include an inner wall 148 and the second portion 114 may include an outer wall 158. The inner wall 148 and the outer wall 158 may be configured to be of similar shape and size, while allowing the inner wall 148 and the outer wall 158 to slidingly interfit with one another to allow the first portion 112 and the second portion 114 to reciprocate relative to one another.

The first portion 112 may terminate in a free end 162. The free end 162 may be open to allow the insertion of the second portion 114. The second portion 114 may terminate in a plunger or other closed end structure 164. An interior gas spring chamber 122 may be defined between the first portion 112 and the second portion 114. The gas spring chamber 122 may be defined between the inner wall 148 of the first portion 112 and the plunger 164. The gas spring chamber 122 may be filled with any desirable gas through a conventional port to a desired pressure level. The pressure in the gas spring chamber 122 may desirably be selected to be sufficient to bias the plunger 164 away from the closed end 140 of the first end 112, thereby biasing the first end 112 and second end 114 relatively away from one another.

When the wheel of the vehicle encounters an obstacle, the impact may be at least partially absorbed by the suspension element 110. The impact may cause the plunger 164 to move toward the closed end 140 of the first portion 112. This movement may reduce the size of the gas chamber 122, thereby causing the gas in the gas chamber 122 to compress and increasing the gas pressure in the chamber 122 in proportion to the reduction in the interior volume of the chamber 122 caused by the plunger. Upon removal of the impact force, the gas pressure force may exceed the impact force and move the plunger 164 away from the closed end 140 of the first portion 112. This movement may cause an increase in the size of the gas chamber 122 and a decrease in the gas pressure in the chamber 122 in proportion to the increase in the interior volume of the housing by the plunger 164.

In many embodiments, it is desirable for there to be only one gas spring chamber. In contrast to the prior art embodiment shown in FIGS. 1-4, no supplemental chamber is used between the plunger 16 and the cap 30. In the prior art embodiment, there is included an outward-facing flange 31 on the second portion 14 and an inward-facing flange 33 on the first portion 12. This set of flanges cooperated to create a first gas cylinder 22 and a second gas cylinder 23. The second gas cylinder 23 is often used to oppose extension of the first and second portions relative to one another. It is also noted that in such a design, there are two dynamic seals used between the first portion 12 and the second portion 14. One dynamic seal is attached to the first portion 12 on its inward-facing flange 33 and contacts the outer surface of the second portion 14. A second dynamic seal is attached to the second portion 14 on its outward facing flange 31 and contacts the inner surface of the first portion 12.

In the present embodiment, instead of including cooperating flanges, there may be no need for a secondary gas cylinder. The outer circumference of the second portion 114 may be substantially the same along its length. Similarly, the inner circumference of the first portion 112 may be substantially the same along its length. This close fit may allow for a minimum of binding between the parts.

Other features of the device are also conventional and are illustrated. For example, in FIG. 7, there is illustrated a structure 700 that allows for adjustment of air pressure within the air chamber 122. This structure 700 may incorporate a variety of static seals that may serve to contain air pressure within the interior gas chamber 122. Similarly, there is illustrated a structure 702 that allows for adjustment of hydraulic pressure within the damper chamber 704. This structure 702 may also incorporate a variety of static seals that may serve to contain air pressure within the damper chamber 704.

Figure 8:
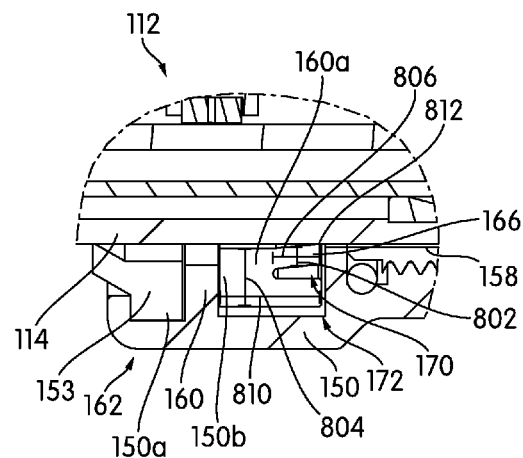
FIG. 8 is a detailed view of the area shown by a dashed circle in FIG. 7.

Turning now to FIG. 8, a more detailed view may be seen of the seal 150b that is attached and extends between the first portion 112 and the second portion 114. The seal 150b may include a base portion 160a that may be inserted into or otherwise secured to a finger 160 disposed at or adjacent the free end 162 of the first end 112. The seal 150b may further include at least one lip portion 166 that extends both axially (along the axis 168 of the suspension system 110) and radially (towards the axis 168 of the suspension system 110). In some embodiments, it may be desirable for the at least one lip portion 166 to extend axially a greater distance than it extends radially. The seal 150b, and in many embodiments, the lip portion 166, may be configured to sealingly engage the outer surface 158 of the second portion 114. The use of such a seal may minimize the escape of gas from the gas spring chamber 122. The lip portion 166 may have a thickness 802 and the base 160a may have a thickness 804. The thickness 802 of the lip portion 166 may be less than about half of the thickness 804 of the base 160a. The lip portion 166 may have a length 806, and the base 160a may have a length 810. The length 806 of the lip portion 166 may be less than about half of the length 810 of the base 106a. In many embodiments, it may be desirable for a free end 812 of the lip portion 166 to engage the second housing member 114. In many embodiments, the lip portion 166 may be axially deformable to allow axial movement, particularly of the free end 812 towards and away from the axis 168.

Figure 9:
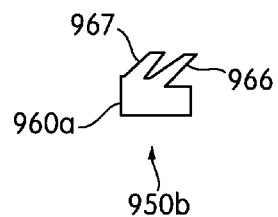
FIG. 9 is a side view of another embodiment of a dynamic gas seal.

An alternative embodiment of the seal may be seen in FIG. 9. FIG. 9 illustrates a seal 950b that has a base portion 960a. The seal 950b also includes a first lip 966 and a second lip 967. As may be seen in FIG. 9, the first lip 966 and the second lip 967 may be of similar size and shape and may project from the base portion at substantially the same angle. However, a designer may choose to vary the thickness and angle of protrusion of each of the lips 966, 967 away from the base portion 960a. The lips may each extend both radially and axially from the base portion and may extend the same or different lengths radially and axially. Further, any number of lips may be used instead of those illustrated in FIGS. 5-10. The embodiments shown are merely exemplary.

The configuration of the seal 150b in FIG. 8 may allow for improved relative reciprocation of the first portion 112 and the second portion 114. When the first portion 112 moves towards the second portion 114 (reducing the size of the gas spring chamber 122), the lip portion may deform in an inward direction relative to the axis 168 (away from the second portion 114) and minimize the surface area of the seal that contacts the second portion 114. This inward deformation may cause the seal to take a chisel shape that may allow for adequate containment of the gas. In the orientation shown in FIG. 8, the compression stroke will involve the first end or portion 112 moving towards the left, towards the second end or portion 114. As may be apparent, when the first end 112 moves towards the second end, the lip portion 166 may deform outwardly and partially into the cavity 170 within the seal 150b. This deformation may minimize contact and friction between the seal 150b and the outer surface 158 of the second end 114. This deformation may allow the compression stroke to occur with a minimum of friction between the seal 150b and the second end 114.

However, during the rebound stroke, the seal 150b has an opposite effect. When the first end 112 moves away from the second end 114 (towards the right in FIG. 8), the lip portion 166 may move inwardly (towards the axis 168). This inward movement may create an increased drag or friction between the seal 150b and the second end 114. This friction may prevent or minimize the effects of premature rebound of the shock absorber.

The precise design of the seal 150b and its attachment to the first end 112 may be modified by a person having ordinary skill in the art. While the seal 150b is attached to a finger 160 adjacent a dust guard (wiping seal) 153 at the free end 162 of the first end 112, this structure may be modified. For example, the finger 160 may be configured differently. The finger 160 may be thicker or thinner than that shown. It may be positioned at a different angle relative to the axis 168. It may be curved or have any other desirable profile.

The seal 150b may be secured adjacent the free end 162 in a number of different ways. The seal 150b may be affixed to the first end 112 by an adhesive. Alternatively, it may be positioned within a cavity, such as the cavity 172, without any adhesive. Alternatively, it may be secured with a fastener. Other methods and structures for attaching or securing the seal 150b in or to the first end 112 are within the capabilities of a person having ordinary skill in the art.

The relative size and shape of the seal 150b and the apparatus as a whole may also be modified by a person having ordinary skill in the art. A designer will be able to modify the size and shape of the seal 150b, along with the extents of its axial and radial extensions in order to produce a desired friction. Further, the seal 150b may be made from a variety of materials capable of substantially producing a seal to enclose air within the shock absorber 110. A designer is able to select an appropriate material to provide an appropriate durability, adhesion, and friction, based on the designer's criteria. In some embodiments, the material may be selected from nitrile, polyurethane, and fluorocarbon. In some embodiments, the material of the seal may have a Shore A hardness between about 60 and about 90.

In many embodiments, the dynamic seal 150b may be the only dynamic seal attached to the first end 112 capable of creating a substantially fluid-tight barrier between the first end 112 and the second end 114. Other seals may, of course be present and may be attached to the first end 112. For example, the dust wiping seal 153 may also be secured adjacent a free end 162 of the first end 112. However, the dust wiping seal 153 is not capable of creating a substantially fluid-tight seal between the first end 112 and the second end 114, due to its orientation and purpose. As also noted above, there may be static seals elsewhere in the design that may be attached to the first end 112 and that may contribute to the creation of a substantially gas-tight chamber 122. As will be described below in connection with FIG. 10, there may be some embodiments where a passageway is created through or around the plunger 164 to create an interaction between the interior gas spring chamber 122 and the damper chamber 704. In such embodiments, additional dynamic seals may be incorporated into the design. However, these dynamic seals are not attached directly to the first end 112 and do not serve to create a substantially gas-tight barrier directly between the first end 112 and the second end 114. Accordingly, such other seals are attached differently and may serve very different purposes than that of the dynamic gas seal 150b.

The remaining features of the design may also be modified as a designer wishes. The present embodiments may be used with a variety of hydraulic dampers. The design shown may be modified in a variety of ways known to a design of ordinary skill to achieve the desired damping characteristics.

Figure 10:
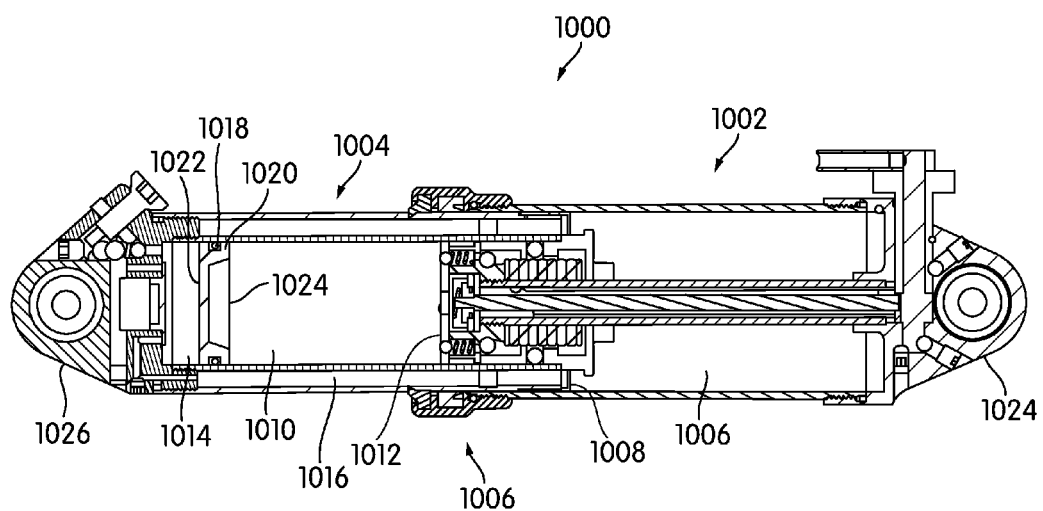
FIG. 10 is a cross-sectional view of an alternative embodiment of the suspension.

For example, an alternative embodiment is shown in FIG. 10. In the alternative shock absorber or suspension system 1000 illustrated in FIG. 10, there is a first end 1002 and a second end 1004. The dynamic sealing structures 1006 and overall configuration are substantially the same as those described above in connection with FIGS. 5-8 and this description will not be repeated here. However, FIG. 10 illustrates a further feature that may be incorporated.

FIG. 10 illustrates an interior gas spring chamber 1006 defined substantially within the first end 1002 and further bounded by a plunger 1008. The suspension system 1000 further includes a hydraulic damping chamber 1010 defined substantially within the second end 1004 and further bounded by a piston 1012. In some embodiments, it may be desirable to incorporate a secondary gas chamber 1014 adjacent the hydraulic damping chamber 1010 and fluidly connected to the interior gas spring chamber 1006 by a gas passageway 1016. A floating ring 1020 may be positioned between the secondary gas chamber 1014 and the hydraulic damping chamber 1010 to separate the gas and the hydraulic fluid and to allow force to be mutually created between the gas and the hydraulic fluid. In many embodiments, it may be desirable to incorporate one or more seals 1018 on the floating ring within the second end 1004 to minimize interaction between the gas and the hydraulic fluid. When a vehicle, such as a bicycle, encounters an obstacle, the first end 1002 and the second end 1004 move relatively toward one another, i.e., the free end 1024 of the first end 1002 moves left as illustrated and the free end 1026 of the second end 1004 moves right as illustrated. This movement causes the plunger 1008 to compress the gas in the interior gas chamber 1006 and the plunger 1012 to compress the fluid within the damper chamber 1010. Upon such movement, the gas under pressure flows into the interaction chamber 1014 and presses on a first side 1022 of the floating ring 1020. Similarly, pressure from the hydraulic fluid in the damper chamber 1010 presses on a second and opposite side 1024 of the floating ring 1020. This pressure from each side serves to damp movement of the piston and the plunger. Accordingly, fluid pressure from the damper chamber 1010 may damp movement of the plunger 1008 into the gas chamber 1006 and gas pressure from the gas chamber 1006 may damp movement of the piston 1012 into the damper chamber 1010. The inclusion of such an interaction chamber may, therefore, allow for better tuning of compression and rebound of the shock absorber 1000.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A shock absorber for a vehicle, comprising:
   a first end adapted to be mounted to one of the frame and a first wheel of the vehicle;
   a second end having a plunger and at least partially defining a damper chamber, said second end reciprocably and slidably mounted to the first end, said second end adapted to be mounted to the other of the frame and the first wheel of the vehicle, wherein an interior gas spring chamber is defined between the first end and the plunger, gas pressure in the interior gas spring chamber biasing the first end and the second end away from one another; and
   a dynamic gas seal attached to the first end and having at least one lip engaging the second end;
      wherein upon movement of the plunger into and reducing the size of the interior gas spring chamber, gas pressure in the interior gas spring chamber and on the dynamic gas seal rises in proportion to the decreasing interior volume of the interior gas spring chamber during the entirety of the movement of the plunger into the interior gas spring chamber, and wherein gas in the interior gas spring chamber is permitted to flow to a second end gas chamber within the second end adjacent the damper chamber;
      wherein upon movement of the plunger out from and increasing the size of the interior gas spring chamber, the gas pressure in the interior gas spring chamber and on the dynamic gas seal falls in proportion to the increasing interior volume of the interior gas spring chamber during the entirety of the movement of the plunger out from the interior gas spring chamber; and
      wherein the dynamic gas seal is the only dynamic seal attached between the first end and the second end that is capable of creating a substantially gas-tight barrier between the first end and the second end.

2. The shock absorber according to claim 1, wherein the dynamic gas seal further comprises a base portion disposed near a free end of the first end.

3. The shock absorber according to claim 2, wherein the at least one lip extends both radially and axially away from the base portion, the at least one lip sealingly contacting the outer surface of the second end.

4. The shock absorber according to claim 3, wherein friction between the at least one lip and the second end is lower when the plunger moves into the interior gas spring chamber than when the plunger moves out from the interior gas spring chamber.

5. The shock absorber according to claim 3, wherein the at least one lip extends farther axially than radially.

6. The shock absorber of claim 1, wherein the vehicle is a bicycle.

7. The shock absorber of claim 1, further comprising a movable barrier separating fluid in the damper chamber from gas in the interior gas spring chamber, the movable barrier capable of allowing a volume of the damping chamber to increase when the plunger moves into the interior gas spring chamber.

8. The shock absorber of claim 7, wherein a hydraulic damper comprises the damper chamber.

9. The shock absorber of claim 8, wherein air pressure from the interior gas spring chamber causes gas to flow from the interior gas spring chamber to the second end gas chamber and thereby pressurizes fluid within the damper chamber.

10. The shock absorber of claim 7, wherein the hydraulic damper further dampens movement of the plunger by applying pressure to gas in the second end gas chamber, thereby affecting the flow of gas between the second end gas chamber and the interior gas spring chamber.

11. A suspension system, comprising:
    a first suspension element having an interior wall and at least partially defining a first gas chamber;
    a second suspension element capable of reciprocating relative to the first suspension element and having an exterior wall slidingly interfitted with the first suspension element and at least partially defining a damping chamber and a second gas chamber;
    a dynamic seal having at least one lip minimizing the escape of gas from within an interior gas chamber defined between the first suspension element and the second suspension element, the dynamic seal being mounted on the first suspension element and being the only dynamic seal fixed to the first suspension element capable of creating a substantially fluid tight barrier between the first suspension element and the second suspension element, and wherein
       the interior wall of the first suspension element fits closely with the exterior wall of the second suspension element regardless of the reciprocal position of the first suspension element relative to the second suspension element; and
       the interior wall of the first suspension element having a consistent circumference along its length; and
    a passageway defined between the first gas chamber and the second gas chamber, wherein during a suspension stroke, gas is forced to move between the first gas chamber and the second gas chamber.

12. The suspension system according to claim 11, wherein the dynamic seal further comprises a base portion disposed adjacent a free end of the first suspension element.

13. The suspension system according to claim 12, wherein the at least one lip extends both radially and axially away from the base portion, the at least one lip sealingly contacting the exterior wall of the second suspension element.

14. The suspension system according to claim 13, wherein friction between the at least one lip and the second suspension element is lower when the two suspension elements move relatively in one direction than when the two suspension elements move relatively in a second direction.

15. The suspension system according to claim 13, wherein the at least one lip extends farther axially than radially.

16. The suspension system of claim 11, wherein the vehicle is a bicycle.

17. The suspension system of claim 11, further comprising a movable barrier separating fluid in the damper chamber from the gas in the second gas chamber, the movable barrier capable of allowing a volume of the damping chamber to increase during a compression portion of the suspension stroke.

18. The suspension system of claim 11, wherein a hydraulic damper comprises the damper chamber.

19. The suspension system of claim 18, wherein air pressure from the first gas chamber causes gas to flow from the first gas chamber to the second gas chamber and thereby pressurizes fluid within the damper chamber.

20. The suspension system of claim 17, wherein fluid pressure from the damper chamber pressurizes air in the first gas chamber by applying pressure to gas in the second gas chamber, thereby affecting the flow of gas between the first gas chamber and the second gas chamber.

* * * * *